United States Patent
McGraw et al.

(10) Patent No.: US 6,804,614 B1
(45) Date of Patent: Oct. 12, 2004

(54) SYNTHETIC PRESSURE ALTITUDE DETERMINING SYSTEM AND METHOD

(75) Inventors: Gary A. McGraw, Cedar Rapids, IA (US); Douglas A. Bell, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/308,755

(22) Filed: Dec. 3, 2002

(51) Int. Cl.[7] .............................................. G01L 7/00
(52) U.S. Cl. ............................................. 702/50; 701/4
(58) Field of Search ............................... 702/50, 47, 98, 702/138, 166; 701/4, 213, 214, 216; 244/76 R; 342/462

(56) References Cited

U.S. PATENT DOCUMENTS 5,952,959 A * 9/1999 Norris .................... 342/357.08
6,216,064 B1 * 4/2001 Johnson et al. ................ 701/4

OTHER PUBLICATIONS

"A Gradient Wind Error Model For The Blanchard Algorithm", by K. Hayward and L. Stephenson, Northrop Grumman, Integrated Systems. 2002, IEEE, pp. 254–262.
"A New Algorithm For Computing Interial Altitude and Vertical Velocity", by R. Blanchard. IEEE Transactions on Aerospace and Electronics Systems, vol. AES–7, No. 6, Nov. 1971.
"Pressure And Blanchard Altitudes Computed From Atmospheric Data Gathered From May Through Jul. 2000 at White Sands, New Mexico", by T. Li and D. Thunborg , Northrop Grumman, Guidance and Control Systems, ION 57th Annual Meeting/CIGTF 20th Bienneial Guidance Test Symposium, Jun. 2001, Albuquerque, NM, pp. 325–333.
"An Improvement To An Algorithm For Computing Aircraft Reference Altitude", by R. Blanchard. IEEE Transactions on Aerospace and Electronics Systems, Sep. 1972.
Co–pending U.S. patent application Docekt No. 03CR071/KE "Synthetic Pressure Altitude Determining System and Method With Wind Correction" by Gary A. McGraw which is being filed on the same day herewith.
Co–pending U.S. patent application Docket No. 03CR072/KE "Synthetic Pressure Altitude Determining System And Method Using Integrity Monitoring From A Pressure Sensor" by Patrick Y. Hwang and Gary A. McGraw which is being filed on the same day herewith.

* cited by examiner

Primary Examiner—Marthe Y. Marc-Coleman
(74) Attorney, Agent, or Firm—Nathan O. Jensen; Kyle Eppele

(57) ABSTRACT

A method of generating a synthetic pressure altitude is disclosed. The method includes providing a static air temperature to a data processing device. The method also includes providing a geometric altitude to the data processing device. Further, the method includes performing a numerical integration based on the static air temperature and the geometric altitude.

20 Claims, 1 Drawing Sheet

SYNTHETIC PRESSURE ALTITUDE DETERMINING SYSTEM AND METHOD

CROSS REFERENCE TO RELATED PATENT APPLICATIONS

This application relates to U.S. patent application Ser. No. 10/308,422, entitled Synthetic Pressure Altitude Determining System and Method with Wind Correction, and U.S. patent application Ser. No. 10/308,621, entitled Synthetic Pressure Altitude Determining System and Method Using Integrity Monitoring From A Pressure Sensor, each of which is filed on the same day herewith.

BACKGROUND

Reduced Vertical Separation Minima (RVSM) requirements dictate substantial improvements in air-data systems and aircraft installation and maintenance. RVSM airspace is any airspace or route between 29,000 ft and 41,000 ft inclusive where aircraft are separated vertically by 1,000 ft (300 m). RVSM decreases the minimum vertical separation from 2000 ft and is being implemented world-wide on a region-by-region basis. Conventionally, minimum vertical separation requirements were 2000 ft and pressure altitude monitoring equipment, which directly measured the pressure outside the aircraft, was used to determine the pressure altitude and provided a proper tolerance to comply with the 2000 ft minimum separation requirement.

With the implementation of RVSM, older pressure altitude measuring equipment and installations may not have sufficient accuracy or reliability to meet RVSM requirements.

RVSM altitude monitoring requirements lead to increased cost for upgrading or replacing conventional air-data equipment and aircraft installations and maintenance. Accordingly, there is a need for a pressure altitude monitoring system that meets RVSM requirements without costly aircraft modification and testing. Further, there is a need for an algorithm that uses geometric altitude to generate and/or correct errors in pressure altitude measurements. Further, there is a need for a GPS altitude and temperature based synthetic pressure computation system which provides a synthetic pressure altitude.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a method of generating a synthetic pressure altitude. The method includes providing a static air temperature to a data processing device and providing a geometric altitude to the data processing device. The method also includes performing a numerical integration based on the static air temperature and the geometric altitude.

Another example of the invention relates to a method of determining the pressure altitude of an aircraft. The method includes providing a static air temperature, from a temperature sensor on the aircraft, to a data processing device. The method also includes providing a geometric altitude, from a position determining system on the aircraft, to the data processing device. Further, the method includes performing a numerical integration based on the static air temperature and the geometric altitude.

Yet another example of the invention relates to a method of generating a synthetic pressure altitude. The method includes providing a geometric altitude from a global positioning system (GPS) receiver to a data processing system. The method also includes performing, by the data processing system, a numerical integration based on the geometrical altitude, the result of the integration being data representative of a synthetic pressure altitude.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
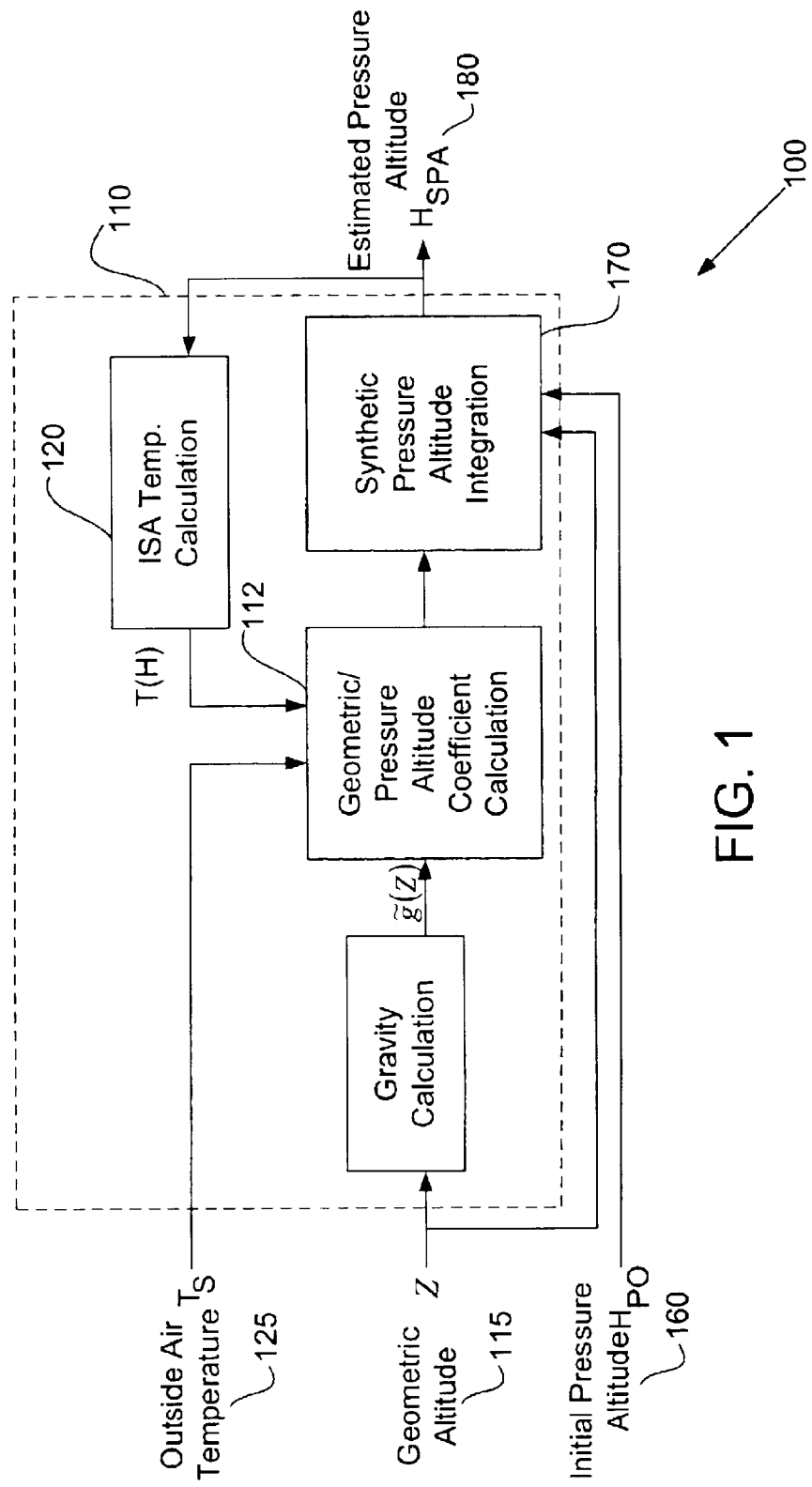
FIG. 1 is a block diagram of a synthetic pressure altitude computation system.

Before describing, in detail the particular improved system and method, it should be observed that the invention includes, but is not limited to a novel structural combination of conventional datalsignal processing components and measurement circuits, and not in the particular detailed configurations thereof. Accordingly, the structure, methods, functions, control and arrangement of conventional components and circuits have, for the most part, been illustrated in the drawings by readily understandable block representations, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Various RVSM altimetry system error (ASE) requirements from FAA guidance materials may be used to come up with statistical requirements to apply to the use of synthetic pressure altitude. For example, For Group Aircraft
   Basic RVSM Envelope requirements considering all sources of ASE are:
      The largest absolute value of the mean ASE should not exceed 80 ft (25 m)
      The largest absolute value of the mean plus three sigma ASE should not exceed 200 ft (60 m)
   The Full RVSM Envelope requirements are:
      The largest absolute value of the mean ASE should not exceed 120 ft (37 m)
      The largest absolute value of the mean plus three sigma ASE should not exceed 245 ft (75 m)
   Individual aircraft in a group should have ASE contained in ±200 ft (±60 m).
For Non-Group Aircraft
   Basic RVSM Envelope requirement is: |Residual static source error+worst case avionics|<160 ft (50 m)
   For Full Envelope: |Residual static source error+worst case avionics|<200 ft (60 m)

Further, the integrity requirement provided in FAA guidance materials includes that the altimetry system failure should be less than $10^{-5}$ per hour. Also, altitude alerts should occur for ±200 ft (±60 m). Overall equipment tolerance in implementing these nominal threshold values should not exceed ±50 ft (±15 m).

To derive a basic model relating geometric and pressure altitudes, a static column of air is assumed.

Pressure altitude is a measurement of geopotential altitude which may be related to geometric altitude by $$G_0 dH = g(Z) dZ \quad (1)$$

where

Z=geometric altitude referenced to Mean Sea Level
H=geopotential altitude
$G_0$=standard acceleration due to gravity=9.80665 m/s$^2$
g(Z)=acceleration due to gravity at altitude Z.

A model for gravity in terms of latitude λ and altitude Z may be given as:

$$g = g_0(1 + g_1 \sin^2\lambda + g_2 Z)$$
$$g_0 = 9.7803 \text{ m/s}^2$$
$$g_1 = 0.005296$$
$$g_2 = -9.6229 \times 10^{-8} \text{ m}^{-1}. \quad (2)$$

Integrating (1) using (2) yields an estimate for geopotential altitude:

$$\int_0^H dH = \int_0^Z \frac{g(Z)}{G_0} dZ \quad (3)$$

$$\hat{H}_{GEO} = (g_0/G_0)\left(1 + g_1 \sin^2\lambda + \frac{1}{2}g_2 Z\right) Z.$$

The basic relationship for modeling the static atmosphere is $$\frac{dP}{P} = -\frac{Mg}{RT} dZ \quad (4)$$

where

P=atmospheric pressure
T=absolute temperature, K
M=mean molecular weight=28.9644 kg/kmol
R=universal gas constant=8314.32 J/kmol*K.

In the international standard atmosphere (ISA) model, geopotential or pressure altitude replaces geometric altitude in (4):

$$\frac{dP}{P} = -\frac{MG_0}{RT(H)} dH. \quad (5)$$

In this model a constant value for gravity is used along with a specific temperature profile, the so-called standard day:

$$T(H) = T_b + LH = \begin{cases} T_0 - 6.5H, & 0 \leq H \leq H_1 \\ T_1, & H_1 < H \leq H_2 \end{cases} \quad (6)$$

where $H_1$=11 km
$H_2$=20 km
$T_0$=288.15 K
$T_1$=216.65 K.

Equations (4) and (5) give two expressions for the incremental change in pressure as a function of changes in geometric and geopotential altitude, respectively. Pressure altitude may be estimated by relating incremental changes in pressure altitude to changes in geometric altitude:

$$\frac{g(Z)}{T(Z)} dZ = \frac{G_0}{T(H)} dH \quad (7)$$

which explicitly shows the dependence of temperature on geometric or geopotential altitude. Using (6), the right hand side of (7) can be integrated easily analytically, but the left hand side may be integrated numerically. Defining $\tilde{g}(Z) = g(Z)/G_0$, we have for $0 \leq H < H_1$;

$$\int_{Z_{n-1}}^{Z} \frac{\tilde{g}(Z)}{T(Z)} dZ = \int_{H_{n-1}}^{H_n} \frac{1}{T_0 + LH} dH \quad (8)$$

$$\int_{Z_{n-1}}^{Z_n} \frac{\tilde{g}(Z)}{T(Z)} dZ = \frac{1}{L} \ln(T_0 + LH) \Big|_{H_{n-1}}^{H_n}$$

$$\ln\left(\frac{T_0 + LH_n}{T_0 + LH_{n-1}}\right) = L \int_{Z_{n-1}}^{Z_n} \frac{\tilde{g}(Z)}{T(Z)} dZ$$

$$H_n = \exp\left\{L \int_{Z_{n-1}}^{Z_n} \frac{\tilde{g}(Z)}{T(Z)} dZ\right\} [T_0/L + H_{n-1}] - T_0/L$$

$$H_n = (1 + c_n) H_{n-1} + c_n \frac{T_0}{L}$$

$$c_n = \exp\left\{L \int_{Z_{n-1}}^{Z_n} \frac{\tilde{g}(Z)}{T(Z)} dZ\right\} - 1$$

For $H_1 < H < H_2$, $T(H) = T_1$, and (7) integrates as $$\int_{Z_{n-1}}^{Z_n} \frac{\tilde{g}(Z)}{T(Z)} dZ = \int_{H_{n-1}}^{H_n} \frac{1}{T_1} dH = \frac{1}{T_1}(H_n - H_{n-1}) \quad (9)$$

$$H_n = H_{n-1} + d_n$$

$$d_n = T_1 \int_{Z_{n-1}}^{Z_n} \frac{\tilde{g}(Z)}{T(Z)} dZ$$

The integrals in (8) and (9) can be evaluated via the trapezoidal rule:

$$c_n = \exp\left\{\frac{L}{2}\left(\frac{\tilde{g}_n}{T_n} + \frac{\tilde{g}_{n-1}}{T_{n-1}}\right)(Z_n - Z_{n-1})\right\} - 1, \quad 0 \leq H \leq H_1 \quad (10)$$

$$d_n = \frac{T_1}{2}\left(\frac{\tilde{g}_n}{T_n} + \frac{\tilde{g}_{n-1}}{T_{n-1}}\right)(Z_n - Z_{n-1}), \quad H_1 < H < H_2$$

The initial condition, $\bar{H}_p(0)$, for the state propagation in (8) can be set either by the known surface pressure at departure from the airport or from a pressure altimeter—which are generally very accurate at low altitudes. Summarizing, the following is the resultant iteration for the synthetic pressure estimate:

$$\hat{H}_p(n) = \begin{cases} (1 + c_n)\hat{H}_p(n-1) + c_n \frac{T_0}{L}, & 0 \leq \hat{H}_p \leq H_1 \\ \hat{H}_p(n-1) + d_n, & H_1 < \hat{H}_p < H_2. \end{cases} \quad (11)$$

Referring now to FIG. 1, a block diagram of a system 100 for generating synthetic pressure altitude and for providing a corrected pressure altitude as an output of system 100, is depicted. System 100 includes a data processing device which may be used to carry out the operation of synthetic computation in block 110. The synthetic pressure computation algorithm receives a geographic height estimate Z from a geometric altitude system 115 which may include but is not limited to a GPS receiver. In other embodiments, either a single GPS unit may be used or more than two GPS receiver units may be used. Further, in alternative embodiments, other geometric height estimators or monitors may be used, including, but not limited to, inertial navigation systems (INS), radar systems, radio altimeters, etc. A static air temperature sensor 125 sends an approximation of static air temperature ($T_S$) to a geometric/pressure altitude coefficient calculator 112. An ISA air temperature model calculation 120 provides a temperature estimate (T(H)) to coefficient calculator 112. The coefficient calculator 112 utilizes equation (10) to determine the coefficients provided to synthetic pressure altitude integrator 170. Further, a pressure altitude monitor 160 provides an estimate of the initial pressure altitude $H_{P0}$ to a synthetic pressure altitude integrator 170. Initial pressure altitude $H_{P0}$ is used for providing initial conditions for the numerical integration. Synthetic pressure computation altitude integrator 170 utilizes equation (11) for providing the numerical and analytical integration which results in the generation of a synthetic pressure altitude $H_{SPA}$ 180.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the exact algorithmic formulations used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of generating a synthetic pressure altitude, comprising:

providing a static air temperature to a data processing device;

providing a geometric altitude to the data processing device; and performing a numerical integration based on the static air temperature and the geometric altitude to yield the synthetic pressure altitude, the synthetic pressure altitude being calculated without a measurement of the air pressure at current altitude.

2. The method of claim 1, wherein the numerical integration is based on a trapezoidal rule.

3. The method of claim 2, wherein the data processing device comprises a flight computer.

4. The method of claim 2, wherein the static air temperature is based on an atmospheric model.

5. The method of claim 1, wherein the geometric altitude is generated from a global positioning system (GPS) signal.

6. The method of claim 1, wherein the geometric altitude signal is generated from an inertial navigation system.

7. The method of claim 1, wherein the geometric altitude signal is generated from a radio altimeter.

8. The method of claim 1, further comprising:

providing an initial pressure altitude to the data processing device.

9. A method of determining the synthetic pressure altitude of an aircraft, comprising:

providing a static air temperature, from a temperature sensor on the aircraft, to a data processing device;

providing a geometric altitude, from a position determining system on the aircraft, to the data processing device; and performing a numerical integration based on the static air temperature and the geometric altitude to yield the synthetic pressure altitude, the synthetic pressure altitude being calculated without a measurement of the air pressure at the current altitude.

10. The method of claim 9, wherein the numerical integration is based on a trapezoidal rule.

11. The method of claim 10, wherein the data processing device comprises a flight computer.

12. The method of claim 10, wherein the static air temperature is based on an atmospheric model.

13. The method of claim 9, wherein the positioning system comprises a global positioning system (GPS) receiver.

14. The method of claim 9, wherein the positioning system comprises an inertial navigation system.

15. The method of claim 9, wherein the positioning system comprises a radio altimeter.

16. The method of claim 9, further comprising:

providing an initial pressure altitude to the data processing device.

17. A method of generating a synthetic pressure altitude, comprising:

providing a geometric altitude from a global positioning system (GPS) receiver to a data processing system; and performing, by the data processing system, a numerical integration based on the geometrical altitude, the result of the integration being data representative of a synthetic pressure altitude the data being calculated without a measurement of the air pressure at the current altitude.

18. The method of claim 17, further comprising:

providing a measured pressure to the data processing device.

19. The method of claim 18, further comprising:

providing a static air temperature to the data processing system.

20. The method of claim 17, further comprising:

providing an initial pressure altitude to the data processing system.

* * * * *